United States Patent [19]

Gotti

[11] 4,043,702
[45] Aug. 23, 1977

[54] WATER WHEEL ASSEMBLY

[76] Inventor: Lui Gotti, P.O. Box 333, El Centro, Calif. 92243

[21] Appl. No.: 568,611

[22] Filed: Apr. 16, 1975

[51] Int. Cl.² .............................................. F03B 7/00
[52] U.S. Cl. ................................. 415/202; 416/197 B; 416/185
[58] Field of Search ..................... 416/197, 185, 197 B, 416/184, DIG. 6, DIG. 4; 415/202, 203

[56] References Cited

U.S. PATENT DOCUMENTS

| 109,925 | 12/1870 | Millard | 416/197 X |
| 282,122 | 7/1883 | Schramm | 416/23 X |
| 338,778 | 3/1886 | Rasmussen | 415/202 |
| 515,674 | 2/1894 | Guldhaug | 415/202 X |
| 606,926 | 7/1898 | Horst | 416/197 |
| 642,067 | 1/1900 | Bash et al. | 415/202 X |
| 673,340 | 4/1901 | Hubartt | 415/202 |
| 973,241 | 10/1910 | Vestal et al. | 416/184 |
| 1,294,050 | 2/1919 | Chute | 415/202 |
| 1,430,406 | 9/1922 | Schulthes et al. | 416/119 |
| 1,522,437 | 1/1925 | Gommer | 416/197 |
| 1,790,175 | 1/1931 | Spencer | 416/13 X |
| 2,097,667 | 11/1937 | Johnson | 416/119 |
| 3,644,052 | 2/1972 | Lininger | 415/202 X |

FOREIGN PATENT DOCUMENTS

| 512,438 | 5/1955 | Canada | 415/202 |
| 744,540 | 1/1944 | Germany | 416/13 |
| 17,758 | 7/1912 | United Kingdom | 415/202 |
| 2,530 | 2/1909 | United Kingdom | 415/202 |

Primary Examiner—Everette A. Powell, Jr.
Attorney, Agent, or Firm—Ralph S. Branscomb

[57] ABSTRACT

The invention comprises a water wheel having spaced parallel circular side walls supported on bearings which are rotationally mounted in a stationary base, these bearings preferably being the wheels of railroad cars, there being a plurality of generally radially extended paddle elements disposed between the side walls and extending from the periphery thereof, and including an upwardly extended chute connected to an elevated water supply, this chute having a lower end shaped to deflect water generally horizontally and tangentially into the upper portion of the water wheel and against the paddle elements.

1 Claim, 4 Drawing Figures

WATER WHEEL ASSEMBLY

BACKGROUND OF THE INVENTION

The art of extracting power from moving water is old and includes numerous and different types of paddle wheels designed to extract power from moving streams and rivers, those having cup-like paddles which are operated by the gravitational force of water supplied from above, and modern hydroelectric turbines wherein high pressure water is utilized to drive the turbine structure. The water wheels of this prior art are conventionally supported by a central axle which is directly coupled to a power take off shaft, requiring the use of extremely heavy duty bearings in the power take off mechanism. There is a need for a water wheel assembly which utilizes both the pressure generated from an elevated water supply and the force of gravity on one quarter of the water wheel, and is supported other than by the central axle so that the power take-off linkage is separated from the support bearings.

SUMMARY OF THE INVENTION

The present invention comprises a water wheel assembly which fulfills the above mentioned need and includes three spaced parallel circular wall elements having a central axle passing therethrough which connects with the power take-off mechanism, the water wheel being supported by a plurality of preferably railroad-type wheels journalled in a base structure beneath these walls. A plurality of radially extended paddle elements mounted to and between the outer walls are driven by substantially horizontally-directed water impinging on the paddles from a chute which delivers water from an elevated supply, whereby the potential energy of the elevated water supply is utilized with a simple water wheel and in the absence of a complicated turbine structure. Each of the paddle elements is also provided with a panel connected between the radially inner end of the paddle and the periphery of the wall to contain the water from the chute during approximately one quarter of the rotational cycle of the wheel so that the gravitational pull on this confined water is used to drive the wheel in addition to the force of the fast-moving water from the chute.

DETAILED DESCRIPTION OF THE PREFERRED EMBODIMENT

Figure 1:
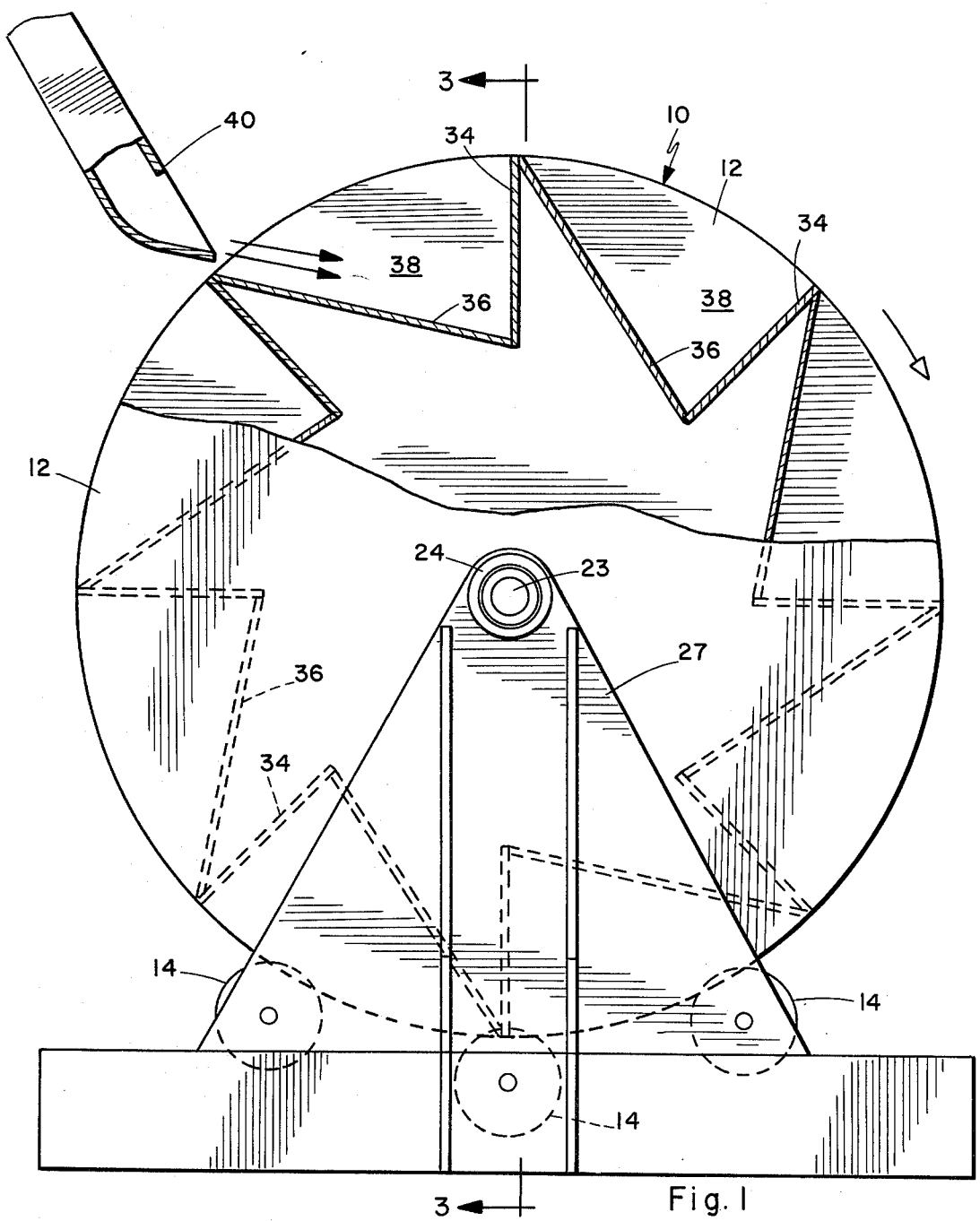
FIG. 1 is a side elevation view of the water wheel assembly with a sidewall partially cut away.
Figure 2:
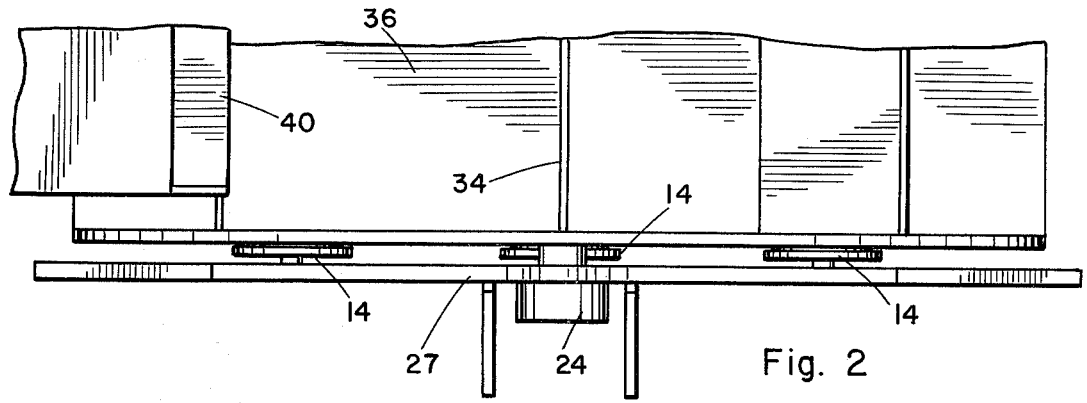
FIG. 2 is a top view of a portion of the assembly.
Figure 3:
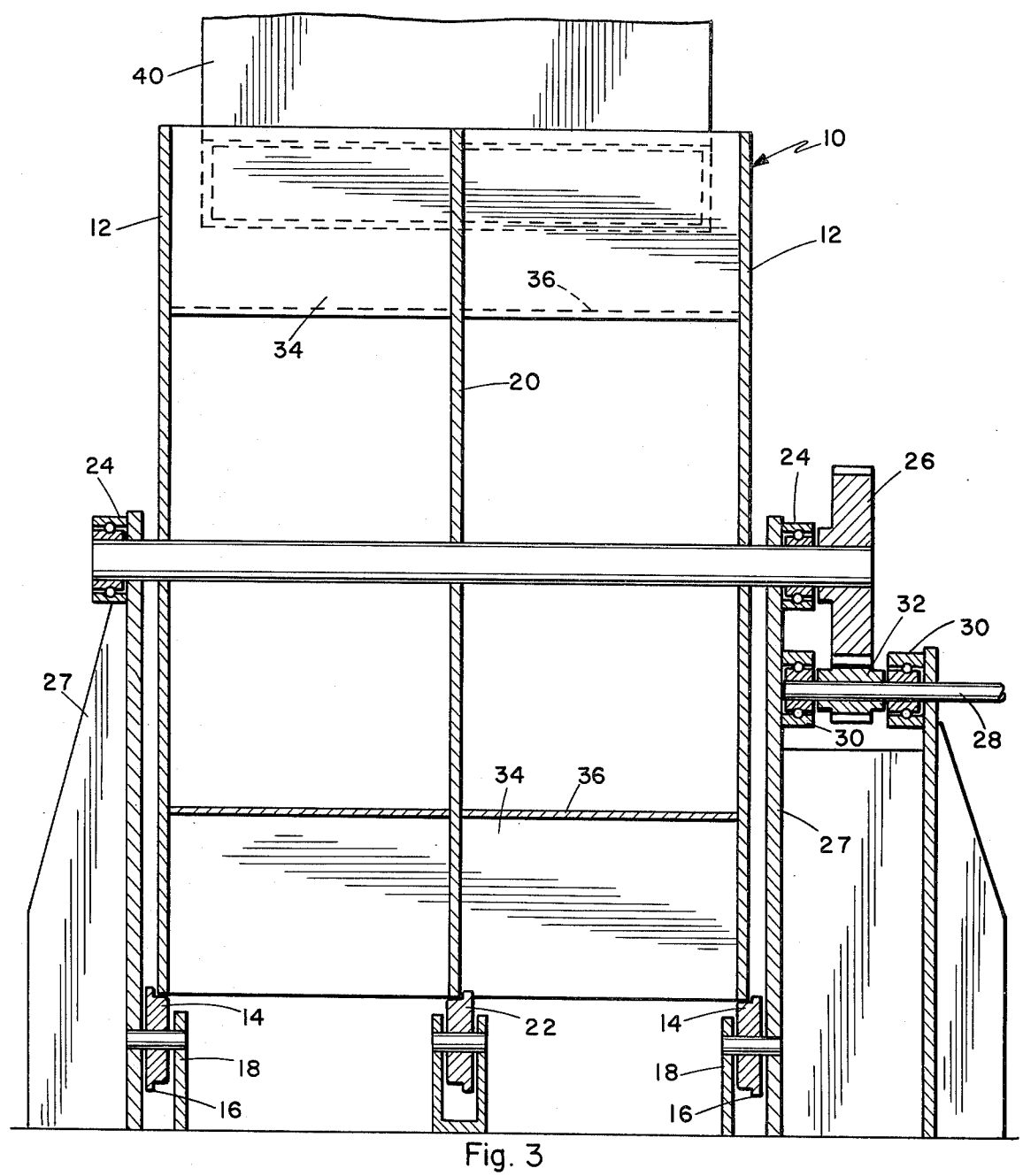
FIG. 3 is a sectional view taken along lines 3—3 of FIG. 1.
Figure 4:
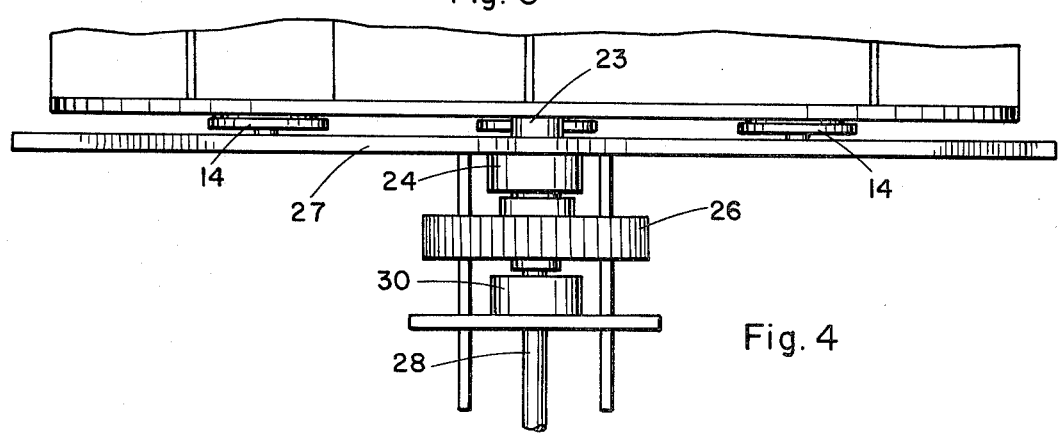
FIG. 4 is a top view of the gear mechanism and a portion of the water wheel assembly.

The invention includes a water wheel, generally indicated at 10, comprising a pair of spaced, circular side walls 12, each of which is supported on a plurality of bearing elements 14, which are preferably rail road wheels having flanges 16 disposed on the outer edge of the walls for lateral stability. The railroad wheels are journalled in supports 18 which are mounted in any suitable base. Parallel to and between sidewalls 12 there may be an additional circular wall 20, this wall being supported by similar bearings 22. The number of the wheels 18 and 22 may be any number greater than 1 for each of the circular walls and need not be limited to 3, and it may be seen that the water wheel structure can rotate on these wheels or bearings independent of any additional support.

An axle 23 passes centrally through all three walls and is journalled in any suitable bearing structure 24, these bearing means being supported by upright stanchions 27 which are firmly secured at their lower extremities in concrete or otherwise stabilized. One end of the axle is provided with a driving gear 26 which delivers power to a take off shaft 28 journalled in the bearings 30, the power take off shaft having a gear 32 matching with the gear 26. Of course, any suitable transmission structure and power take off means could be used. As previously noted, the support for the wheel structure is provided by the bearing elements 18 and 22 so that the bearings 24 need not be exceptionally heavy duty.

A plurality of radially extended paddle elements 34 are mounted between the side walls 12 at angularly spaced intervals, these paddles, of course, being spaced and extending inwardly partway from the circumference of the side walls. Each of these paddle elements has a panel 36 joined to the inner edge thereof and extending at an angle on the order of 90° to the circumferences of the side walls to form a pocket-like cavity 38 between the side walls.

A water chute 40 extends upwardly from the water wheel to a water supply, not shown, to the lower end of the chute which opens and has a shelf-like deflection panel to direct water from the elevated source generally toward the paddle elements 34 as they are sequentially exposed during the rotation of the wheel. It would also, of course, be possible to substitute one or more pipes for the chute 40, the essential feature of the conduit being used, being that it directs the water directly against the paddle element.

In operation of the device, it can be seen that water supplied from the chute 40 will be delivered at high speeds against the paddles 34, the force derived therefrom causing the wheel to turn at a rapid rate. As the wheel rotates, water will be trapped in the pockets 38 and under the force of gravity will further force the wheel to rotate in the clockwise direction as shown in FIG. 1. Thus the full potential energy of the elevated water supply is extracted by the water wheel without the use of high pressure turbines and without the need for an exceptionally large wheel or conveyor assembly that extends substantially to the height of the water supply.

I claim:
1. A water wheel assembly comprising:
 a. a water wheel having
  i. a pair of spaced parallel circular side walls;
  ii. a plurality of radially extended paddles mounted to and between peripheral portions of said side walls, each of said paddles having a radially inner edge and a panel mounted to and between said side walls and extending from the radially inner edge of the respective paddle substantially normally thereto and extending substantially to the circumference of said side walls;
 b. means of supporting said water wheel for rotation on a horizontal axis comprising a plurality of flanged railroad car wheels rotationally mounted beneath and in supporting contact with said side walls and having flanges thereof mutually oppositely disposed to laterally secure said water wheel, said wheels each being non-translatory and having an axis parallel to the axis of said water wheel and the axes of said side walls;

c. a generally straight conduit extending upwardly to an elevated water supply and being open at the lower end, the lower end of said conduit being directed generally across the upper portion of said water wheel normal to the axis thereof such that water gushing from said conduit is directed generally toward consecutive ones of said paddles as said water wheel rotates;

d. said water wheel having an axle, and including mechanical linkage means coupling said axle to a power take-off shaft.

* * * * *